(12) United States Patent
Sugamura

(10) Patent No.: US 8,009,969 B2
(45) Date of Patent: Aug. 30, 2011

(54) DISK UNIT-INTEGRATED DISPLAY

(75) Inventor: Tomokazu Sugamura, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1163 days.

(21) Appl. No.: 11/783,596

(22) Filed: Apr. 10, 2007

(65) Prior Publication Data

US 2008/0019222 A1 Jan. 24, 2008

(30) Foreign Application Priority Data

Apr. 11, 2006 (JP) ................................. 2006-108589

(51) Int. Cl.
*H04N 5/77* (2006.01)
(52) U.S. Cl. ......... 386/358; 720/647; 720/616; 720/646
(58) Field of Classification Search .................. 720/646, 720/647, 616, 651
See application file for complete search history.

(56) References Cited

U.S. PATENT DOCUMENTS

| 5,220,552 | A | * | 6/1993 | Yokoi et al. ................... 720/646 |
| 5,833,470 | A | * | 11/1998 | Harrison et al. .............. 434/323 |
| 2005/0138652 | A1 | | 6/2005 | Liao et al. |
| 2005/0213933 | A1 | | 9/2005 | Tajima et al. |
| 2006/0045495 | A1 | * | 3/2006 | Prabhune et al. ............. 386/125 |
| 2007/0147795 | A1 | | 6/2007 | Iwai et al. |

FOREIGN PATENT DOCUMENTS

| EP | 0 227 107 A2 | 7/1987 |
| EP | 0 307 917 A1 | 3/1989 |
| JP | 3003568 U | 8/1994 |
| JP | 9-68932 A | 3/1997 |
| JP | 11-163554 A | 6/1999 |
| JP | 2002-334566 A | 11/2002 |
| JP | 3093877 U | 2/2003 |
| JP | 2003-85956 A | 3/2003 |
| JP | 2005-190580 A | 7/2005 |
| JP | 2005-278063 A | 10/2005 |
| JP | 3120055 U | 3/2006 |

OTHER PUBLICATIONS

English Translation of Specification for Korean Application Publication KR 2003-0080879.*
European Search Report dated Nov. 25, 2008 (five pages).
Japanese Office Action including English translation dated Apr. 22, 2008 (four (4) pages).
Japanese Office Action dated Sep. 30, 2008 w/English translation (two (2) pages).
"Xoro HTC1401: TV/DVD-MPEG4", Reviews.ru, http://www.reviews.ru/clause/article.asp?id=1188, Jan. 23, 2005, (Three (3) pages).
Russian Office Action dated Apr. 15, 2011 including English-language translation (Seven (7) pages).

* cited by examiner

*Primary Examiner* — Peter-Anthony Pappas
*Assistant Examiner* — Eileen Adams
(74) *Attorney, Agent, or Firm* — Crowell & Moring LLP

(57) ABSTRACT

A disk unit-integrated display includes a door member opening and closing when projecting and housing a disk tray, and including a door portion and an arm portion for rotating the door portion, and a housing including an opening for projecting and housing the disk tray and a plurality of operating portions. The plurality of operating portions of the housing are arranged at a height position to overlap with the arm portion, in a region other than a region in which the arm portion located on a lower side end of the door portion is arranged, so as to hold the arm portion therebetween.

14 Claims, 5 Drawing Sheets

DISK UNIT-INTEGRATED DISPLAY

BACKGROUND OF THE INVENTION

1. Field of the Invention

The present invention relates to a disk unit-integrated display, and more particularly, it relates to a disk unit-integrated display comprising an operating portion for operating a disk unit-integrated display body.

2. Description of the Background Art

A picture reproducer-integrated display such as a disk unit comprising an operating portion for operating a disk unit-integrated display body is known in general, as disclosed in each of Japanese Patent Laying-Open No. 2005-278063, Japanese Utility Model Registration No. 3003568 and Japanese Patent Laying-Open No. 9-68932 (1997), for example.

The aforementioned Japanese Patent Laying-Open No. 2005-278063 discloses a DVD unit integrated-television receiver arranged with the operating portion on an outer surface below a take-out portion (opening) for storing a recording medium of a DVD (digital versatile disk) unit inside a disk unit-integrated display body. Although not specified, it is conceivable that an outward opening door member opening so as to project toward the outer surface is arranged on the take-out portion in this DVD unit-integrated television receiver. This outward opening door member of the DVD unit integrated-television receiver generally has an arm portion provided with a rotary shaft on an inner surface below the take-out portion and arranged on the inner surface below the take-out portion.

The aforementioned Utility Model Registration No. 3003568 discloses a video tape recorder-integrated television arranged with an operation button (operating portion) on an outer surface below a cassette receiving portion (opening) for storing a recording medium of a video tap recorder inside a disk unit-integrated display body in an unexposed state. Although not specified, it is conceivable that an inward opening door member opening so as to project toward an inner surface arranged on the cassette receiving portion in this video tap recorder-integrated television. This inward opening door member of the video tap recorder-integrated television generally has a pair of protrusions provided with a rotary shaft on an inner surface above the cassette receiving portion and rotatably supported on the inner surface above the cassette receiving portion.

The aforementioned Japanese Patent Laying-Open No. 9-68932 (1997) discloses a monitor television-integrated computer arranged with an operating portion below an opening projecting and housing a disk tray of a CD drive.

In the DVD unit integrated-television receiver disclosed in the aforementioned Japanese Patent Laying-Open No. 2005-278063, however, in a case where the arm portion of the door member is arranged on the inner surface below the take-out portion, it is conceivable that the operating portion is arranged below the arm portion. Thus, it is conceivable that the arm portion and the operating portion are arranged adjacent to each other in a height direction, whereby reduction in the height of the DVD unit integrated-television receiver is disadvantageously difficult.

In the video tap recorder-integrated television disclosed in the aforementioned Utility Model Registration No. 3003568, in a case where the inward opening door member is provided on the inner surface above the cassette receiving portion, it is conceivable that the inward opening door member is not provided with an arm portion provided with a rotary shaft, but provided with a pair of protrusions provided with rotary shafts and the pair of protrusions are rotatably supported by a housing, dissimilarly to a case where the outward opening door member is provided in the DVD unit integrated-television receiver disclosed in the aforementioned Japanese Patent Laying-Open No. 2005-278063. Thus, it is conceivable that the inward opening door member of the video tap recorder-integrated television does not have an arm portion. Consequently, a problem of the present invention, that reduction in the height of the DVD unit integrated-television receiver is difficult due to the arm portion of the door member, does not exist.

It is conceivable that the monitor television-integrated computer disclosed in the aforementioned Japanese Patent Laying-Open No. 9-68932 (1997) does not have a door member, dissimilarly to the DVD unit integrated-television receiver disclosed in the aforementioned Japanese Patent Laying-Open No. 2005-278063. Thus, a problem of the present invention, that reduction in the height of the DVD unit integrated-television receiver is difficult due to the arm portion of the door member, does not exist.

SUMMARY OF THE INVENTION

The present invention has been proposed in order to solve the aforementioned problem, and an object of the present invention is to provide a disk unit-integrated display capable of reducing the height of the disk unit-integrated display comprising a door member having an arm portion.

A disk unit-integrated display according to a first aspect of the present invention comprises a door member opening and closing when projecting and housing a disk tray, and including a door portion and an arm portion for rotating the door portion, and a housing arranged with the door member, and including an opening for projecting and housing the disk tray and a plurality of operating portions for operating a disk unit-integrated display body, wherein the plurality of operating portions of the housing are arranged at a height position to overlap with the arm portion, in a region other than a region in which the arm portion located on a lower side end of the door portion is arranged, so as to hold the arm portion therebetween.

In the disk unit-integrated display according to the first aspect, as hereinabove described, the operating portions of the housing are arranged at the height position to overlap with the arm portion, whereby the arm portion can be arranged on a portion further closer to a bottom surface of the housing as compared with a case where the arm portion is arranged above the operating portions of the housing. Thus, the height of the disk unit-integrated display can be reduced. The operating portions of the housing are arranged in the region other than region in which the arm portion located on the lower side end of the door portion is arranged, so as to hold the arm portion therebetween, whereby the operating portions can be inhibited from interfering with the arm portion in a case where the operating portions of the housing are so arranged at the height position to overlap with the arm portion. The operating portions are arranged not only below the opening but also lateral to the opening, whereby the number of operating portions capable of being arranged on the housing can be inhibited from reduction also in a case where the operating portions are arranged in the region other than the limited region in which the arm portion is arranged.

In the disk unit-integrated display according to the aforementioned first aspect, the arm portion is preferably integrally formed with the door portion. According to this structure, the number of components can be inhibited from increase dissimilarly to a case where the arm portion is formed by a different member from the door portion.

The disk unit-integrated display according to the aforementioned first aspect preferably further comprises an arm mounting portion integrally formed on an inner surface of the housing below the opening, rotatably mounted on the arm portion of the door member, wherein the plurality of operating portions of the housing are preferably arranged at a height position to overlap with the arm portion and the arm mounting portion, in a region other than regions in which the arm portion located on a lower side end of the door portion and the arm mounting portion below and lateral to the opening are arranged, so as to hold the arm portion and the arm mounting portion therebetween. According to this structure, the operating portions of the housing can be inhibited from interfering with the arm portion and the arm mounting portion, also in a case where the operating portions are arranged at the height position to overlap with the arm portion and the arm mounting portion.

In the disk unit-integrated display according to the aforementioned first aspect, the arm portion preferably includes a first arm portion and a second arm portion provided on a first end and a second end of the door portion respectively, and the operating portions preferably include a first operation button arranged below the opening, a second operation button arranged lateral to the first arm portion and a third operation button arranged lateral to the second arm portion. According to this structure, the second operation button and the third operation button are arranged lateral to the opening in addition to the arrangement of the first operation button arranged below the opening also in a case where the operating portions arranged in the limited region other than the regions in which the first arm portion and the second arm portion are arranged, whereby the number of operation buttons capable of being arranged on the housing can be easily inhibited from reduction.

In the aforementioned structure in which the arm portion includes the first arm portion and the second arm portion, and the operating portion includes the first operation button, the second operation button and the third operation button, the disk unit-integrated display preferably further comprises an infrared receiving portion receiving an infrared signal from outside, wherein the infrared receiving portion is preferably provided adjacent to the first operation button arranged below the opening, at a height position to overlap with the arm portion. According to this structure, the infrared receiving portion can be arranged below the opening along with the first operation button at the same height position as the first operation button. Thus, a region for arranging the light receiving portion may not be ensured, whereby the disk unit-integrated display can be downsized.

In the aforementioned structure in which the arm portion includes the first arm portion and the second arm portion, and the operating portion includes the first operation button, the second operation button and the third operation button, the disk unit-integrated display preferably further comprises a terminal connecting portion for connecting a terminal of an external apparatus, wherein the terminal connecting portion is preferably provided adjacent to the second operation button arranged lateral to the opening, at a height position to overlap with the arm portion. According to this structure, the terminal connecting portion can be arranged lateral to the opening along with the second operation button, at the height position to overlap with the arm portion, whereby the terminal connecting portion can be arranged at the same height position as the second operation button. Thus, a region in a vertical direction for arranging the terminal connecting portion may not be ensured, whereby the disk unit-integrated display can be downsized.

In the aforementioned structure in which the arm portion includes the first arm portion and the second arm portion, and the operating portion includes the first operation button, the second operation button and the third operation button, the second operation button arranged lateral to the first arm portion and the third operation button arranged lateral to the second arm portion are preferably provided at a height position to overlap with the opening, respectively. According to this structure, the second operation button and the third operation button are arranged lateral to the opening respectively, whereby the sizes of the second operation button and the third operation button can be formed to be larger than those of the first operation button arranged below the opening. Thus, workability of the disk unit-integrated display can be improved due to the further largely formed second and third operation buttons.

In the disk unit-integrated display according to the aforementioned first aspect, the door portion of the door member is preferably so arranged as to project from an outer surface of the housing when the door member is in an open state. According to this structure, the region in which the door portion is arranged may not be ensured inside the housing dissimilarly to a case where the door portion is so arranged as to project toward the inner surface of the housing when the door member is in an open state, whereby the disk unit can be arranged at a position further closer to the door member. Thus, the disk unit-integrated display can be downsized.

In the disk unit-integrated display according to the aforementioned first aspect, the operating portions of the housing are preferably integrally formed with the housing. According to this structure, the number of components can be inhibited from increase dissimilarly to a case where the operating portions are formed by different members.

In the disk unit-integrated display according to the aforementioned first aspect, the operating portions of the housing are preferably formed on an outer surface of the housing in an exposed state. According to this structure, the operating portions may not be formed in an inner portion from the front surface of the housing dissimilarly to a case where a cover member covering the operating portions is provided and the operating portions are formed in the inner portion from the front surface of the housing so that a surface of the cover member is aligned with the front surface of the housing with no step with the cover member closed. Thus, a circuit board can be arranged on a position further closer to the front surface of the housing. Consequently, the disk unit-integrated display can be downsized.

A disk unit-integrated display according to a second aspect of the present invention comprises a door member opening and closing when projecting and housing a disk tray, and including a door portion and an arm portion for rotating the door portion; and a housing arranged with the door member, and including an opening for projecting and housing the disk tray and a plurality of operating portions for operating a disk unit-integrated display body, and further comprises an arm mounting portion integrally formed on an inner surface of the housing below the opening, rotatably mounted on the arm portion of the door member, wherein the arm portion includes a first arm portion and a second arm portion provided on a first end and a second end of the door portion respectively, the operating portions are integrally formed with the housing on an outer surface of the housing in an exposed state, and include a first operation button arranged below the opening, a second operation button arranged lateral to the first arm portion and a third operation button arranged lateral to the second arm portion, the operating portions including the first operation button, the second operation button and the third operation button of the housing are arranged at a height position to overlap with the arm portion including the first arm portion and the second arm portion and the arm mounting portion, in a region other than regions in which the arm portion and the arm mounting portion are arranged, so as to hold the arm portion and the arm mounting portion therebetween, and the door portion of the door member is so arranged as to project from the outer surface of the housing when the door member is in an open state.

In the disk unit-integrated display according to the second aspect, as hereinabove described, the operating portions of the housing are arranged at the height position to overlap with the arm portion, whereby the arm portion can be arranged on a portion further closer to a bottom surface of the housing as compared with a case where the arm portion is arranged above the operating portions of the housing. Thus, the height of the disk unit-integrated display can be reduced. The operating portions of the housing are arranged in the region other than region in which the arm portion located on lower side end of the door portion is arranged, so as to hold the arm portion therebetween, whereby the operating portions can be inhibited from interfering with the arm portion in a case where the operating portions of the housing are so arranged at the height position to overlap with the arm portion. The operating portions are arranged not only below the opening but also lateral to the opening, whereby the number of operating portions capable of being arranged on the housing can be inhibited from reduction also in a case where the operating portions are arranged in the region other than the region in which the arm portion is arranged. The arm mounting portion rotatably mounted with the arm portion of the door member is provided on the inner surface below the opening, the operating portions of the housing are arranged in the region other than the regions in which the arm portion located on the lower side end of the door portion and the arm mounting portion below and lateral to the opening are arranged so as to hold the arm portion and the arm mounting portion therebetween, whereby the operating portions of the housing can be inhibited from interfering with the arm portion and the arm mounting portion, also in a case where the operating portions are arranged at the height position to overlap with the arm portion and the arm mounting portion. In addition, the arm portion includes a first arm portion and a second arm portion provided on a first end and a second end of the door portion respectively, and the operating portions include a first operation button arranged below the opening, a second operation button arranged lateral to the first arm portion and a third operation button arranged lateral to the second arm portion. Thus, the second operation button and the third operation button are arranged lateral to the opening in addition to the arrangement of the first operation button arranged below the opening also in a case where the operation buttons arranged in the limited region other than the regions in which the first arm portion and the second arm portion are arranged, whereby the number of operation buttons capable of being arranged on the housing can be easily inhibited from reduction. The door portion is so arranged as to project from an outer surface of the housing when the door member is in an open state, whereby the region in which the door portion is arranged may not be ensured inside the housing dissimilarly to a case where the door portion is so arranged as to project toward the inner surface of the housing when the door member is in an open state, whereby the disk unit can be arranged at a position further closer to the door member. Thus, the disk unit-integrated display can be downsized. The operating portions of the housing are integrally formed with the housing, whereby the number of components can be inhibited from increase dissimilarly to a case where the operating portions are formed by different members. The operating portions of the housing are formed on the outer surface of the housing in an exposed state, whereby the operating portions may not be formed in an inner portion from the front surface of the housing dissimilarly to a case where a cover member covering the operating portions is provided and the operating portions are formed in the inner portion from the front surface of the housing so that a surface of the cover member is aligned with the front surface of the housing with no step with the cover member closed. Thus, a circuit board can be arranged on a position further closer to the front surface of the housing. Consequently, the disk unit-integrated display can be downsized.

In the disk unit-integrated display according to the aforementioned second aspect, the arm portion is preferably integrally formed with the door portion. According to this structure, the number of components can be inhibited from increase dissimilarly to a case where the arm portion is formed by a different member from the door portion.

The disk unit-integrated display according to the aforementioned second aspect preferably further comprises an infrared receiving portion receiving an infrared signal from outside, wherein the infrared receiving portion is provided adjacent to the first operation button arranged below the opening, at a height position to overlap with the arm portion. According to this structure, the infrared receiving portion can be arranged below the opening along with the first operation button at the same height position as the first operation button. Thus, a region for arranging the light receiving portion may not be ensured, whereby the disk unit-integrated display can be downsized.

The disk unit-integrated display according to the aforementioned second aspect preferably further comprises a terminal connecting portion for connecting a terminal of an external apparatus, wherein the terminal connecting portion is preferably provided adjacent to the second operation button arranged lateral to the opening, at a height position to overlap with the arm portion. According to this structure, the terminal connecting portion can be arranged lateral to the opening along with the second operation button, at the height position to overlap with the arm portion, whereby the terminal connecting portion can be arranged at the same height position as the second operation button. Thus, a region in a vertical direction for arranging the terminal connecting portion may not be ensured, whereby the disk unit-integrated display can be downsized.

In the disk unit-integrated display according to the aforementioned second aspect, the second operation button arranged lateral to the first arm portion and the third operation button arranged lateral to the second arm portion are preferably provided at a height position to overlap with the opening, respectively. According to this structure, the second operation button and the third operation button are arranged lateral to the opening respectively, whereby the sizes of the second operation button and the third operation button can be formed to be larger than those of the first operation button arranged below the opening. Thus, workability of the disk unit-integrated display in the time of operation can be improved due to the further largely formed second and third operation buttons.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

A structure of a DVD-integrated television 1 according to the embodiment of the present invention will be described with reference to FIGS. 1 to 5. The embodiment of the present invention is applied to the DVD-integrated television, which is an exemplary disk unit-integrated display.

Figure 1:
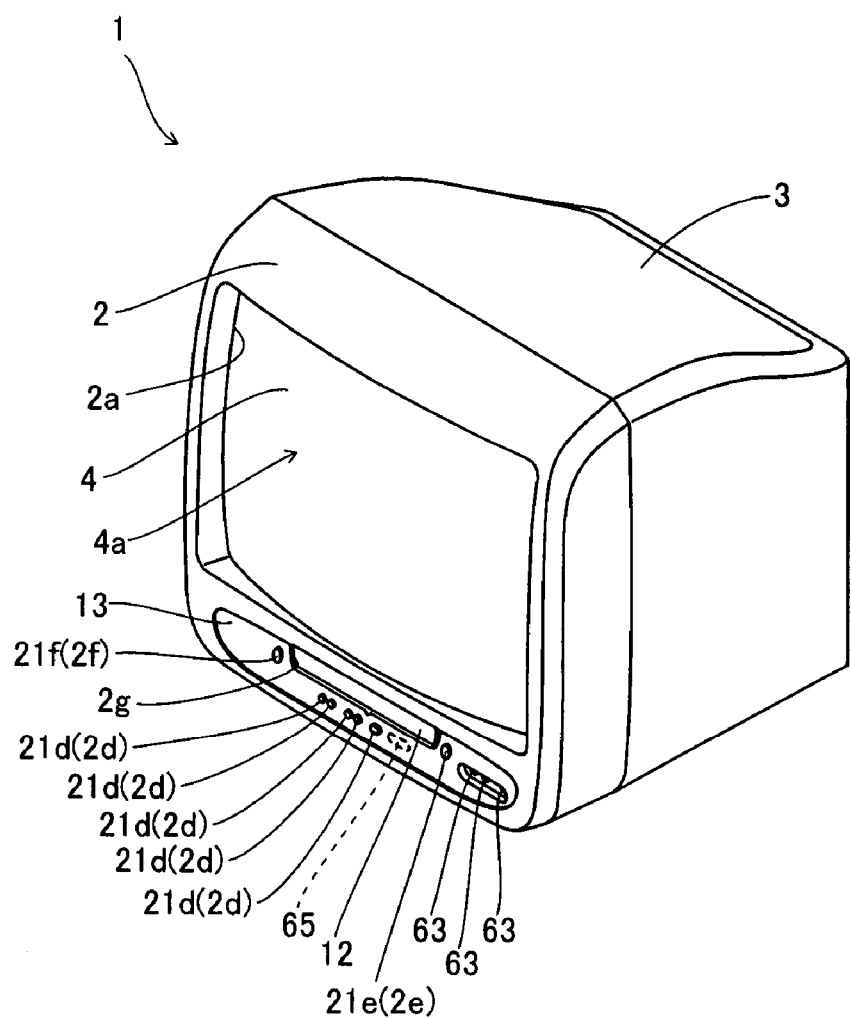
FIG. 1 is a perspective view showing an overall structure of a DVD-integrated television according to an embodiment of the present invention.
Figure 2:
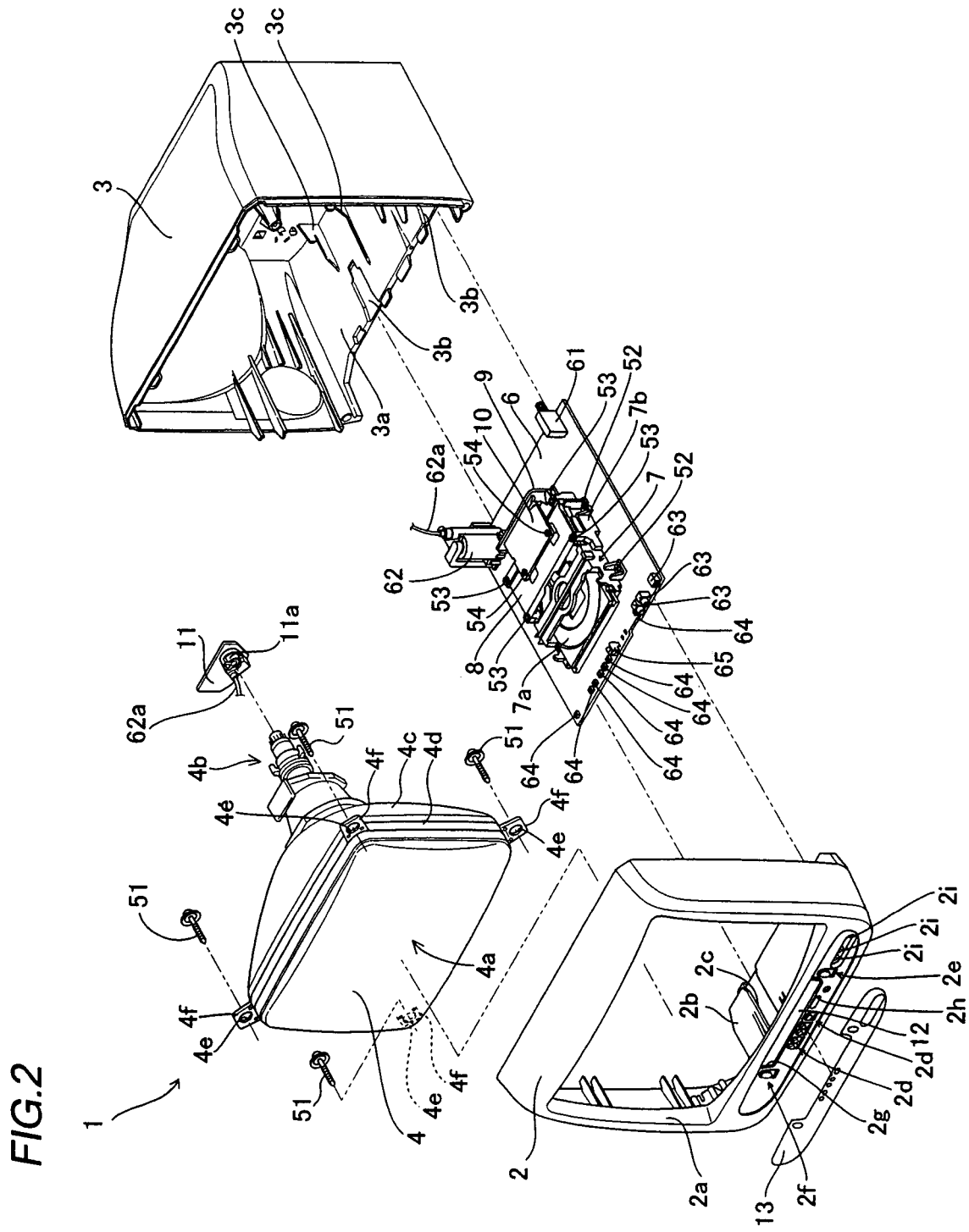
FIG. 2 is an exploded perspective view of the DVD-integrated television according to the embodiment shown in FIG. 1.

As shown in FIGS. 1 and 2, the DVD-integrated television 1 according to the embodiment of the present invention comprises a front cabinet 2 and a rear cabinet 3 constituting an outer frame of the DVD-integrated television 1, a CRT (cathode ray tube) 4 mounted on the front cabinet 2, a holder 5 made of resin (see FIG. 5), a main circuit board 6 for controlling a television, a DVD drive unit 7 for driving a DVD (digital versatile disk) (not shown), a cover member 8 made of metal, a relay board 9, a DVD circuit board 10 for controlling the DVD drive unit 7, a CRT circuit board 11 for controlling the CRT 4, a door member 12 mounted on the front cabinet 2 in an openable/closable manner and a sheet member 13. The front cabinet 2 is an example of the "housing" in the present invention.

Figure 3:
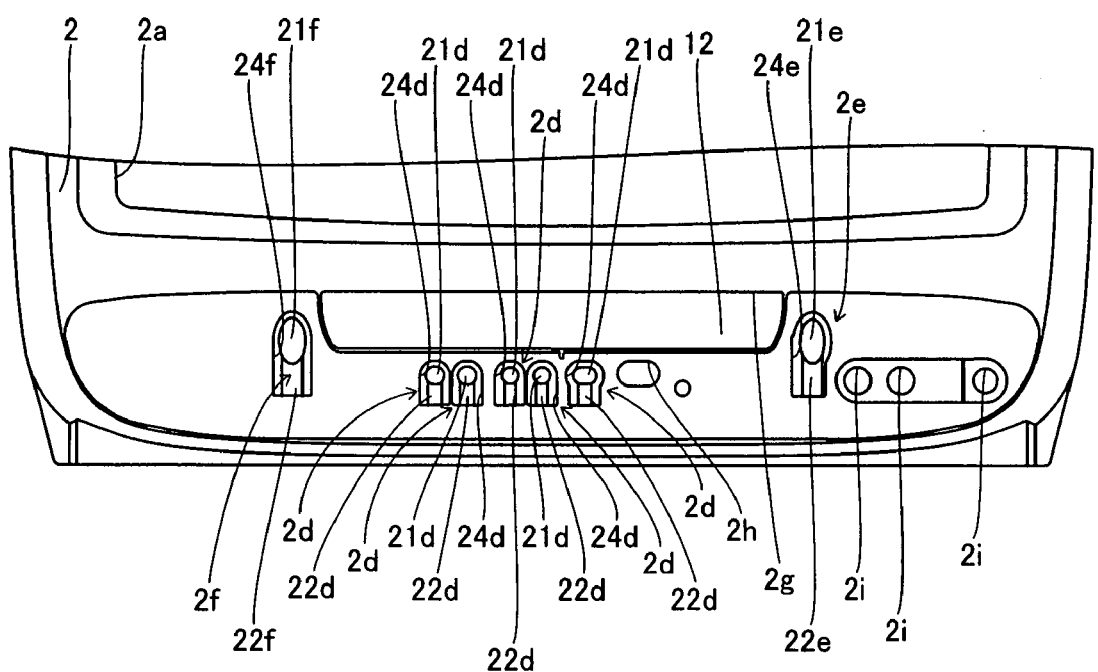
FIG. 3 is an enlarged front elevational view showing the vicinity of a lower end of a front cabinet of the DVD-integrated television according to the embodiment shown in FIG. 1.
Figure 4:
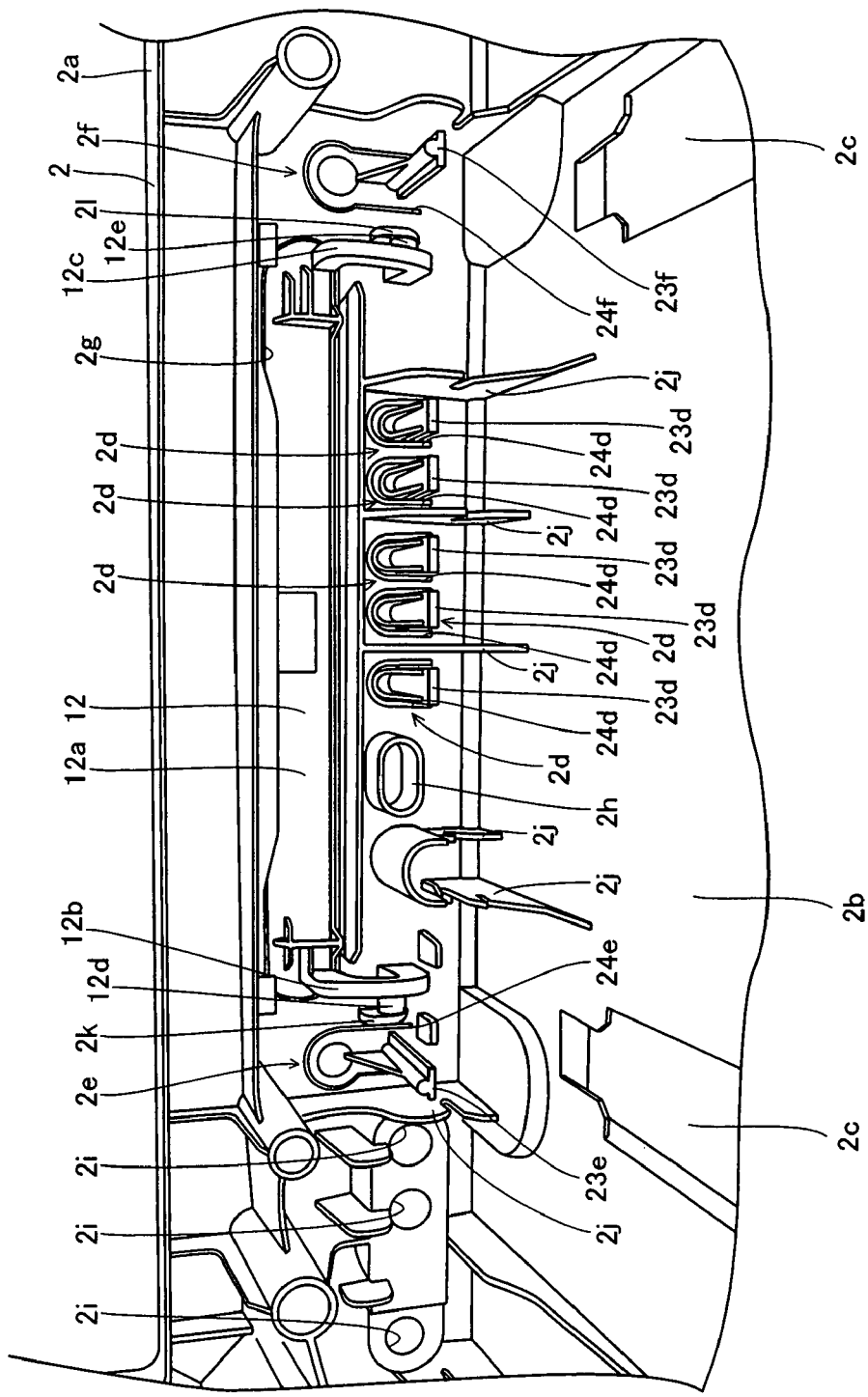
FIG. 4 illustrates the vicinity of the lower end of the front cabinet of the DVD-integrated television according to the embodiment shown in FIG. 1 from inside.

According to this embodiment, the front cabinet 2 includes a display window 2a exposing a display region 4a of the CRT 4, a bottom surface 2b, a pair of rail portions 2c formed on the bottom surface 2b, operation buttons 2d, 2e and 2f for operating a disk unit-integrated display body, an opening 2g for projecting an after-mentioned disk tray 7a of the DVD drive unit 7 outside the front cabinet 2, an opening 2h for arranging an after-mentioned light receiving sensor 65 of the main circuit board 6, three terminal receiving holes 2f in which terminal connecting portions 63 of the main circuit board 6 are arranged, a plurality of holding rib portions 2j for holding the main circuit board 6, and arm mounting portions 2k and 2l rotatably supporting the door member 12, as shown in FIGS. 1, 3 and 4. The operation buttons 2d, 2e and 2f are examples of the "first operation button", "second operation button" and "third operation button" in the present invention respectively.

According to this embodiment, as shown in FIGS. 3 and 4, the operation buttons 2d, 2e and 2f of the front cabinet 2 are formed with U-shaped cutout portions 24d, 24e and 24f around the operation buttons 2d, 2e and 2f respectively, whereby circular button portions 21d, 21e and 21f and coupling portions 22d, 22e and 22f are formed. Plate-like sensor press portions 23d, 23e and 24f are so formed at the same height position inside the operation buttons 2d, 2e and 2f as to extend in a direction substantially perpendicular to the coupling portions 22d, 22e and 22f respectively. Thus, when the button portions 21d, 21e and 21f are pressed, the coupling portions 22d, 22e and 22f are elastically deformed so that the sensor press portions 23d, 23e and 24f move downward. The five operation buttons 2d are formed below the opening 2g.

The operation buttons 2e and 2f are formed lateral to aftermentioned arm portions 12b and 12c of the door member 12 respectively. The operation buttons 2d are a volume control button, a channel selector button and the like, for example. The operation button 2e is an open/close button for opening and closing the door member 12 to take out and put in a DVD for example, while the operation button 2f is a power button for example.

According to this embodiment, the opening 2g of the front cabinet 2 is formed below the display window 2a as shown in FIGS. 3 and 4. The opening 2g is arranged with the door member 12 in an openable/closable manner. An opening 2h of the front cabinet 2 is formed below the opening 2g at the substantially same height position as the operation buttons 2d. Three terminal receiving holes 21 of the front cabinet 2 are formed lateral to the operation button 2e at the substantially same height position as the operation buttons 2d. A plurality of the holding rib portions 2j of the front cabinet 2 are provided in the vicinity of the operation buttons 2d, 2e and 2f. The arm mounting portions 2k and 2l of the front cabinet 2 are formed on the inner surface of the front cabinet 2 below the opening 2g. Thus, the rotary shafts (the shaft portion 12d of the arm portion 12b and the shaft portion 12e of the arm portion 12c) of the door member 12 mounted on the arm mounting portions 2k and 2l are so formed as to be located below the opening 2g.

The rear cabinet 3 is provided with a bottom surface 3a, a pair of rail portions 3b formed on the bottom surface 3a, holding rib portions 3c for holding the main circuit board 6, as shown in FIG. 2. The rear cabinet 3 is mounted on the front cabinet 2 by tightening screws (not shown) with respect to the front cabinet 2.

The CRT 4 is mounted on the front cabinet 2 while the display region 4a is exposed from the display window 2a of the front cabinet 2, as shown in FIGS. 1 and 2. The CRT 4 includes the display region 4a, an electron gun 4b emitting an electron beam, and a glass tube 4c forming a vacuum region, and an explosion-proof band 4d made of iron wound around the glass tube 4c. The explosion-proof band 4d of the CRT 4 is formed in a belt-shape and is wound around the glass tube 4c at a prescribed position, and thus has a function of preventing implosion of the glass tube 4c in a vacuum state. Four corners of the explosion-proof band 4d wound around the glass tube 4c in the form of a substantial rectangle are formed with screw mounting portions 4f formed with screw receiving holes 4e for mounting the CRT 4 on the front cabinet 2 respectively. Screws 51 are fitted in screw receiving holes (not shown) of the front cabinet 2 through the screw receiving holes 4e of the screw mounting portions 4f respectively, whereby the CRT 4 is mounted on the front cabinet 2.

The holder 5 (see FIG. 5) made of resin includes four rail engaging portions (not shown) engaged with the pair of rail portions 2c of the front cabinet 2 and the pair of rail portions 3b of the rear cabinet 3. Thus, the rail engaging portions (not shown) of the holder 5 are engaged with the rail portions 2c of the front cabinet 2 and the rail portions 3b of the rear cabinet 3 when the front cabinet 2 and the rear cabinet 3 are assembled, whereby the holder 5 is so formed as to be mounted on the front cabinet 2 and the rear cabinet 3.

The main circuit board 6 for controlling the television is mounted on the holder 5 with screws (not shown) as shown in FIG. 2. The main circuit board 6 is mounted with an antenna receiving portion 61 receiving an antenna wire, a fly back transformer 62 supplying a high voltage to the CRT 4, three terminal connecting portions 63 used when connecting to other apparatus, seven detection sensors 64 for detecting that the operation buttons 2d, 2e and 2f are pressed, and the light receiving sensor 65 receiving a signal such as an infrared signal transmitted from an apparatus such as a remote control. When the holder 5 is mounted on the front cabinet 2 and the rear cabinet 3, the main circuit board 6 is held by the holding rib portions 2j of the front cabinet 2 and the holding rib portions 3c of the rear cabinet 3. When the holder 5 is mounted on the front cabinet 2 and the rear cabinet 3, the three terminal connecting portions 63 are outwardly exposed through the terminal receiving holes 2i of the front cabinet 2 respectively. When the holder 5 is mounted on the front cabinet 2 and the rear cabinet 3, the seven detection sensors 64 are so arranged as to be located below the sensor press portions 23d, 23e and 24f of the operation buttons 2d, 2e and 2f respectively. Thus, in a case where the button portions 21d, 21e and 21f are pressed and the sensor press portions 23d, 23e and 24f moves downward, the sensor press portions 23d, 23e and 24f press the detection sensors 64, whereby it is possible to detect whether or not the operation buttons 2d, 2e and 2f are pressed by the detection sensors 64. When the holder 5 is mounted on the front cabinet 2 and the rear cabinet 3, the light receiving sensor 65 is outwardly exposed through the opening 2h of the front cabinet 2. The light receiving sensor 65 is an example of the "infrared receiving portion" in the present invention.

According to this embodiment, the terminal connecting portions 63 are provided adjacent to the operation button 2e arranged lateral to the opening 2g, at the height position to overlap with the arm portions 12b and 12c. The light receiving sensor 65 is provided adjacent to the operation buttons 2d arranged below the opening 2g, at the height position to overlap with the arm portions 12b and 12c.

The DVD drive unit 7 includes a disk tray 7a, a DVD drive unit body portion 7b on which the disk tray 7a is mounted slidably in an anteroposterior direction as shown in FIG. 2. The disk tray 7a slides in the anteroposterior direction, whereby the disk tray 7a is projected outside the front cabinet 2 through the opening 2g of the front cabinet 2 and is housed inside the front cabinet 2. Thus, the disk tray 7a has a function of conveying a DVD (not shown) placed thereon. The DVD drive unit body portion 7b is mounted on the holder 5 through the main circuit board 6 by screws 52.

The cover member 8 is mounted on the DVD drive unit 7 by screws 53 as shown in FIG. 2. The relay board 9 is electrically connected to the main circuit board 6 and is mounted in a direction perpendicular to the main circuit board 6. The DVD circuit board 10 for controlling the DVD drive unit 7 is mounted on the cover member 8 by screws 54. The DVD circuit board 10 is electrically connected to the relay board 9 and has a function of supporting the relay board 9. The CRT circuit board 11 for controlling the CRT 4 is mounted with a mounting portion 11a connected to the CRT 4. The CRT circuit board 11 is connected to the fly back transformer 62 mounted on the main circuit board 6 by a cable 62a.

Figure 5:
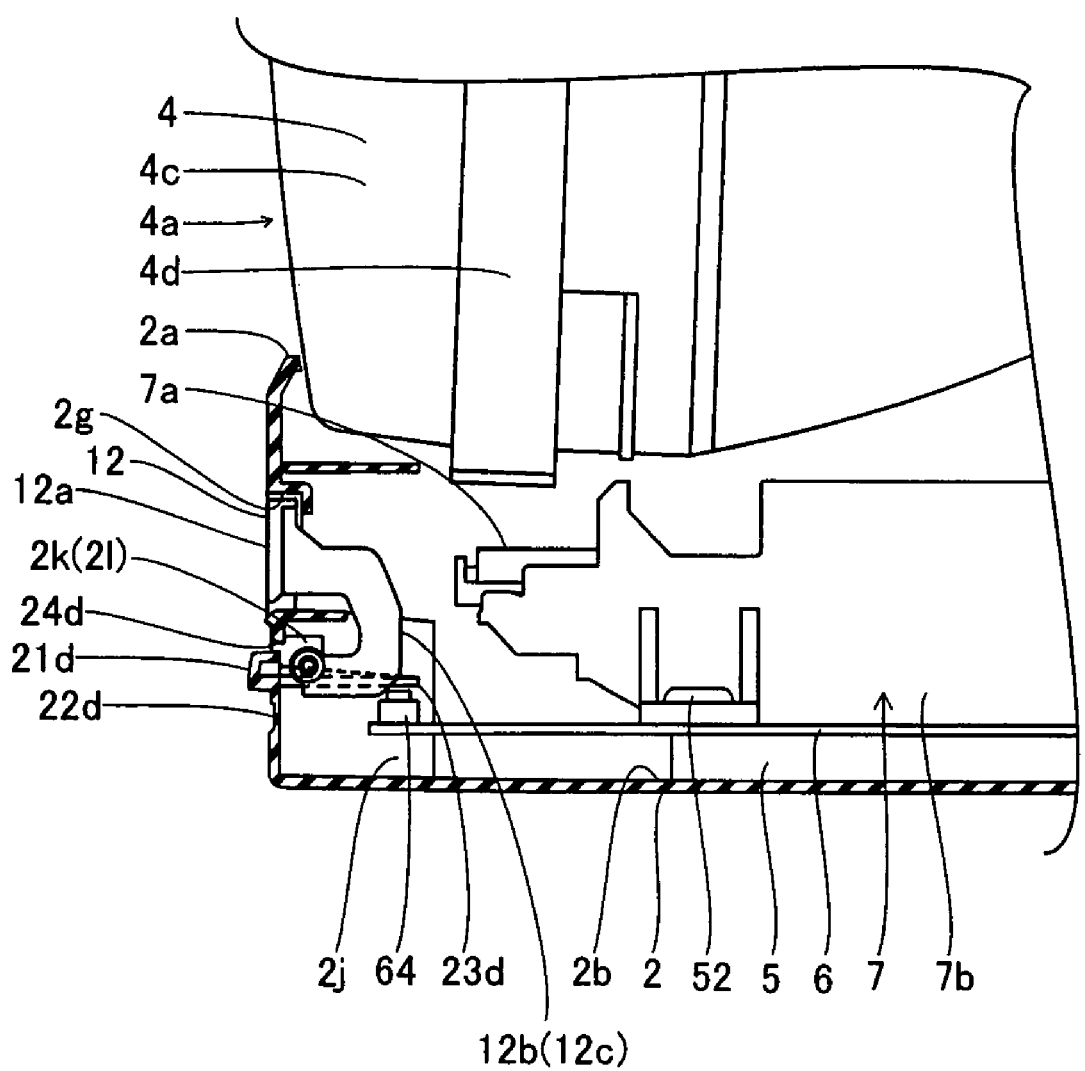
FIG. 5 is a sectional side view of the DVD-integrated television according to the embodiment shown in FIG. 1.

According to this embodiment, the door member 12 mounted on the front cabinet 2 in an openable/closable manner has a function of opening and closing in conjunction with projecting and housing of the disk tray 7a as shown in FIGS. 4 and 5. The door member 12 includes a door portion 12a and the arm portions 12b and 12c provided on both ends of the door portion 12a. The arm portions 12b and 12c have first ends integrally coupled with the door portion 12a, and have the shaft portions 12d and 12e located on second end rotatably mounted on the arm mounting portions 2k and 2l of the front cabinet 2 respectively. At this time, the arm portions 12b and 12c are arranged at the height position to overlap with the operation buttons 2d, 2e and 2f, while the operation buttons 2d, 2e and 2f are arranged in regions other than regions in which the arm portions 12b and 12c and the arm mounting portions 2k and 2l are arranged, so as to hold the arm portions 12b and 12c as well as the arm mounting portions 2k and 2l therebetween. The operation button 2e arranged lateral to the arm portion 12b and the operation button 2f arranged lateral to the arm portion 12c are provided at the height position to overlap with the opening 2g. The sizes of the operation buttons 2e and 2f are so formed as to be substantially larger as compared with those of the operation buttons 2d. When the door member 12 is in an open state, the door portion 12a of the door member 12 is so formed as to be arranged outside the front cabinet 2. The arm portions 12b and 12c are examples of the "first arm portion" and the "second arm portion" in the present invention respectively.

As shown in FIGS. 1 to 3, the sheet member 13 outwardly exposes the door member 12, the three terminal connecting portions 63 and the button portions 21d, 21e and 21f, and has a function of covering the U-shaped cutout portions 24d, 24e and 24f around the operation buttons 2d, 2e and 2f.

According to this embodiment, as hereinabove described, the operation buttons 2d, 2e and 2f of the front cabinet 2 are arranged at the height position to overlap with the arm portions 12b and 12c, whereby the arm portions 12b and 12c can be arranged on a portion further closer to the bottom surface 2b of the front cabinet 2 as compared with a case where the arm portion is arranged above the operation buttons of the housing. Thus, the height of the DVD-integrated television 1 can be reduced.

According to this embodiment, the operation buttons 2d, 2e and 2f of the front cabinet 2 are arranged in a region other than regions in which the arm portions 12b and 12c located on lower side ends of the door portion 12a are arranged, so as to hold the arm portions 12b and 12c therebetween, whereby the operation buttons 2d, 2e and 2f can be inhibited from interfering with the arm portions 12b and 12c in a case where the operation buttons 2d, 2e and 2f of the front cabinet 2 are so arranged at the height position to overlap with the arm portions 12b and 12c.

According to this embodiment, the arm mounting portions 2k and 2l rotatably mounted on the arm portions 12b and 12c of the door member 12 are provided on inner surface below the opening 2g and the operation buttons 2d, 2e and 2f of the front cabinet 2 are arranged in a region other than regions in which the arm portions 12b and 12c located on lower side ends of the door portion 12a and the arm mounting portions 2k and 2l below and lateral to the opening 2g are arranged, so as to hold the arm portions 12b and 12c as well as the arm mounting portions 2k and 2l therebetween, whereby the operation buttons 2d, 2e and 2f of the front cabinet 2 can be inhibited from interfering with the arm portions 12b and 12c and the arm mounting portions 2k and 2l, also in a case where the operation buttons 2d, 2e and 2f are arranged at the height position to overlap with the arm portions 12b and 12c and the arm mounting portions 2k and 2l.

According to this embodiment, the door member 12 includes the arm portions 12b and 12c provided on the first end and the second end of the door portion 12a respectively, and the front cabinet 2 includes the operation buttons 2d arranged below the opening 2g, the operation button 2e arranged lateral to the arm portion 12b and the operation button 2f arranged lateral to the arm portion 12c, whereby the operation buttons 2e and 2f are arranged lateral to the opening 2g in addition to the arrangement of the operation buttons 2d below the opening 2g. Thus, the number of operation buttons capable of being arranged on the front cabinet 2 can be easily inhibited from reduction.

According to this embodiment, the operation buttons 2d, 2e and 2f of the front cabinet 2 are integrally formed with the front cabinet 2, whereby the number of components can be inhibited from increase dissimilarly to a case where the operation buttons are formed by different members.

According to this embodiment, the button portions 21d, 21e and 21f of the front cabinet 2 are arranged on the outer surface of the front cabinet 2 in an exposed state, whereby the operation buttons 2d, 2e and 2f may not be formed in an inner portion from the front surface of the front cabinet 2 dissimilarly to a case where a cover member covering the button portions is provided and the operating portions are formed in the inner portion from the front surface of the front cabinet 2 so that a surface of the cover member is aligned with the front surface of the front cabinet 2 with no step with the cover member closed. Thus, the main circuit board 6 can be arranged on a position further closer to the front surface of the front cabinet 2. Consequently, the DVD-integrated television 1 can be downsized.

According to this embodiment, the arm portions 12b and 12c are integrally formed with the door portion 12a, whereby the number of components can be inhibited from increase dissimilarly to a case where the arm portions 12b and 12c are formed by different members from the door portion 12a.

According to this embodiment, the DVD-integrated television 1 further comprises the light receiving sensor 65 receiving an infrared signal transmitted from outside, the light receiving sensor 65 is provided adjacent to the operation buttons 2d arranged below the opening 2g, at the height positions to overlap with the arm portions 12b and 12c, whereby the light receiving sensor 65 can be arranged below the opening 2g along with the operation buttons 2d at the same height position as the operation buttons 2d. Thus, a region for arranging the light receiving sensor 65 may not be ensured, whereby the DVD-integrated television 1 can be downsized.

According to this embodiment, the DVD-integrated television 1 further comprises the terminal connecting portions 63 for connecting a terminal of an external apparatus, the terminal connecting portions 63 are provided adjacent to the operation button 2e arranged lateral to the opening 2g at the height position to overlap with the arm portions 12b and 12c, whereby the terminal connecting portions 63 can be arranged lateral to the opening 2g along with the operation button 2e at the same height position as the operation button 2e. Thus, a region in a vertical direction for arranging the terminal connecting portions 63 may not be ensured, whereby the DVD-integrated television 1 can be downsized.

According to this embodiment, the operation button 2e arranged lateral to the arm portion 12b and the operation button 2f arranged lateral to the arm portion 12c are provided at the height position to overlap with the opening 2g respectively, the operation button 2e and the operation button 2f are arranged lateral to the opening 2g respectively. Thus, the sizes of the operation button 2e and the operation button 2f can be formed to be larger than those of the operation buttons 2d arranged below the opening 2g. Consequently, workability of the DVD-integrated television 1 in the time of operation can be improved due to the further largely formed operation buttons 2e and 2f.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the DVD-integrated television comprising the DVD drive unit as an exemplary disk unit-integrated display, the present invention is not restricted to this but is also applicable to a display comprising other disk unit.

While the aforementioned embodiment is applied to the operation buttons 2d, 2e and as an exemplary operating portion, the present invention is not restricted to this but is also applicable to a DVD-integrated television comprising an operating portion other than the operation button.

While the door member 12 is provided with the arm portions 12b and 12c and the front cabinet 2 is provided with the arm mounting portions 2k and 2l in the aforementioned embodiment, the present invention is not restricted to this but the door member may be provided with one arm portion, and the front cabinet may be provided with one arm mounting portion, or the door member may be provided with three or more arm portions and the front cabinet may be provided with three or more arm mounting portions.

While the five operation buttons 2d are provided below the opening 2g, the one operation button 2e is provide lateral to the arm portion 12b, and the one operation button 2f is provided lateral to the arm portion 12c in the aforementioned embodiment, the present invention is not restricted to this but at most four or at least six operation buttons may be provided below the opening 2g. Alternatively, two or more operation buttons may be provided lateral to the arm portion 12b and two or more operation buttons may be provided lateral to the arm portion 12c.

What is claimed is:

1. A disk unit-integrated display comprising:
a door member opening and closing when projecting and housing a disk tray, and including a door portion and an arm portion for rotating said door portion;
a housing arranged with said door member, and including an opening for projecting and housing said disk tray and a plurality of operating portions for operating a disk unit-integrated display body; and
an arm mounting portion integrally formed on an inner surface of said housing below said opening, rotatably mounted on said arm portion of said door member, wherein
said plurality of operating portions of said housing are arranged at a height position to overlap with said arm portion and said arm mounting portion, in a region other than regions in which said arm portion located on a lower side end of said door portion and said arm mounting portion below and lateral to said opening are arranged, so as to hold said arm portion and said arm mounting portion therebetween.

2. The disk unit-integrated display according to claim 1, wherein
said arm portion includes a first arm portion and a second arm portion provided on a first end and a second end of said door portion respectively, and
said operating portions include a first operation button arranged below said opening, a second operation button arranged lateral to said first arm portion and a third operation button arranged lateral to said second arm portion.

3. The disk unit-integrated display according to claim 2, further comprising an infrared receiving portion receiving an infrared signal from outside, wherein
said infrared receiving portion is provided adjacent to said first operation button arranged below said opening, at a height position to overlap with said arm portion.

4. The disk unit-integrated display according to claim 2, further comprising a terminal connecting portion for connecting a terminal of an external apparatus, wherein said terminal connecting portion is provided adjacent to said second operation button arranged lateral to said opening, at a height position to overlap with said arm portion.

5. The disk unit-integrated display according to claim 2, wherein said second operation button arranged lateral to said first arm portion and said third operation button arranged lateral to said second arm portion are provided at a height position to overlap with said opening, respectively.

6. The disk unit-integrated display according to claim 1, wherein said door portion of said door member is so arranged as to project from an outer surface of said housing when said door member is in an open state.

7. The disk unit-integrated display according to claim 1, wherein said operating portions of said housing are integrally formed with said housing.

8. The disk unit-integrated display according to claim 1, wherein said operating portions of said housing are formed on an outer surface of said housing in an exposed state.

9. The disk unit-integrated display according to claim 1, wherein said arm portion is integrally formed with said door portion.

10. A disk unit-integrated display comprising: a door member opening and closing when projecting and housing a disk tray, and including a door portion and an arm portion for rotating said door portion; and a housing arranged with said door member, and including an opening for projecting and housing said disk tray and a plurality of operating portions for operating a disk unit-integrated display body, further comprising an arm mounting portion integrally formed on an inner surface of said housing below said opening, rotatably mounted on said arm portion of said door member, wherein said arm portion includes a first arm portion and a second arm portion provided on a first end and a second end of said door portion respectively, said operating portions are integrally formed with said housing on an outer surface of said housing in an exposed state, and include a first operation button arranged below said opening, a second operation button arranged lateral to said first arm portion and a third operation button arranged lateral to said second arm portion, said operating portions including said first operation button, said second operation button and said third operation button of said housing are arranged at a height position to overlap with said arm portion including said first arm portion and said second arm portion and said arm mounting portion, in a region other than regions in which said arm portion and said arm mounting portion are arranged, so as to hold said arm portion and said arm mounting portion therebetween, and said door portion of said door member is so arranged as to project from said outer surface of said housing when said door member is in an open state.

11. The disk unit-integrated display according to claim 10, wherein said arm portion is integrally formed with said door portion.

12. The disk unit-integrated display according to claim 10, further comprising an infrared receiving portion receiving an infrared signal from outside, wherein said infrared receiving portion is provided adjacent to said first operation button arranged below said opening, at a height position to overlap with said arm portion.

13. The disk unit-integrated display according to claim 10, further comprising a terminal connecting portion for connecting a terminal of an external apparatus, wherein said terminal connecting portion is provided adjacent to said second operation button arranged lateral to said opening, at a height position to overlap with said arm portion.

14. The disk unit-integrated display according to claim 10, wherein said second operation button arranged lateral to said first arm portion and said third operation button arranged lateral to said second arm portion are provided at a height position to overlap with said opening, respectively.

* * * * *